United States Patent
Okita

(10) Patent No.: US 9,755,566 B2
(45) Date of Patent: Sep. 5, 2017

(54) CONTROLLER AND CONTROL METHOD FOR MACHINE TOOL CAPABLE OF CHANGING MOTION DEPENDING ON MOTOR TEMPERATURE

(71) Applicant: FANUC CORPORATION, Minamitsuru-gun, Yamanashi (JP)

(72) Inventor: Tadashi Okita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 84 days.

(21) Appl. No.: 14/510,667

(22) Filed: Oct. 9, 2014

(65) Prior Publication Data
US 2015/0102756 A1 Apr. 16, 2015

(30) Foreign Application Priority Data
Oct. 10, 2013 (JP) ................. 2013-212833

(51) Int. Cl.
| | |
|---|---|
| *H02P 29/64* | (2016.01) |
| *H02P 5/74* | (2006.01) |
| *H02P 29/00* | (2016.01) |
| *H02P 29/02* | (2016.01) |
| *H02P 29/60* | (2016.01) |

(52) U.S. Cl.
CPC .......... *H02P 29/0044* (2013.01); *H02P 29/02* (2013.01); *H02P 29/60* (2016.02)

(58) Field of Classification Search
CPC ................................................. G05B 19/406
See application file for complete search history.

(56) References Cited

U.S. PATENT DOCUMENTS

| | | | | |
|---|---|---|---|---|
| 6,291,959 | B1 * | 9/2001 | Yoshida | G05B 19/404 318/567 |
| 6,515,442 | B1 | 2/2003 | Okubo | |
| 6,810,360 | B2 * | 10/2004 | Fujishima | G05B 19/404 700/174 |

(Continued)

FOREIGN PATENT DOCUMENTS

| | | |
|---|---|---|
| CN | 1322311 | 11/2001 |
| JP | 09085582 | 3/1997 |

(Continued)

*Primary Examiner* — Eduardo Colon Santana
*Assistant Examiner* — Charles S Laughlin
(74) *Attorney, Agent, or Firm* — RatnerPrestia

(57) ABSTRACT

A controller and a method for a machine tool, capable of discriminating the factors in overheating, and taking appropriate measures depending on each factor. A first amplifier of the controller has an acceleration/deceleration judging part which judges as to whether the spindle motor is accelerated or decelerated; a first temperature estimating part which estimates a first amount of change in temperature of the spindle motor when the spindle motor is in the acceleration/ deceleration state; a second temperature estimating part which estimates a second amount of change in temperature of the spindle motor when the spindle motor is in the steady state; a comparing part which compares the first and second estimated values. A numerical controlling part of the controller transmits an operation command for changing the operation of at least one of the spindle motor and a feed shaft motor, when the spindle motor is overheated.

10 Claims, 4 Drawing Sheets

(56) References Cited

U.S. PATENT DOCUMENTS

| | | | |
|---|---|---|---|
| 7,766,541 B2 * | 8/2010 | Sato | .................. G01K 15/00 374/1 |
| 2006/0247888 A1 * | 11/2006 | Kojima | ............. B23Q 11/0007 702/130 |
| 2006/0279241 A1 | 12/2006 | Tsutsui | |

FOREIGN PATENT DOCUMENTS

| | | |
|---|---|---|
| JP | 09-179623 | 7/1997 |
| JP | 2000271836 | 10/2000 |
| JP | 2003-009563 | 1/2003 |
| JP | 2009-041130 | 2/2009 |
| JP | 2010076057 | 4/2010 |
| WO | 2005122385 | 12/2005 |

\* cited by examiner

CONTROLLER AND CONTROL METHOD FOR MACHINE TOOL CAPABLE OF CHANGING MOTION DEPENDING ON MOTOR TEMPERATURE

BACKGROUND OF THE INVENTION

1. Field of the Invention

The present invention relates to a controller having a function for changing a motion of a machine tool, depending on the temperature of a motor for driving a spindle of the machine tool, and a method for controlling the machine tool.

2. Description of the Related Art

In a machine tool having a spindle or a feed shaft driven by a motor, the temperature of a motor for driving the spindle increases, and therefore the motor may be overheated, when the machine tool carries out a heavy-duty cutting or a processing wherein the spindle is frequently accelerated or decelerated, etc. In order to avoid such a problem, for example, JP 2003-009563 A discloses a technique for detecting the temperature of a servomotor for driving a movable body, and controlling the servomotor so that an acceleration/deceleration time constant of the movable body is changed depending on the detected temperature.

JP H09-179623 A discloses a technique for generating temperature data by predicting and calculating the temperature of a feed shaft motor, comparing the temperature data to previously stored temperature data, and changing an acceleration/deceleration time constant of the feed shaft depending on the comparison result.

Further, JP 2009-041130 A discloses a technique for calculating a virtual motor temperature based on an average load torque of a motor for driving a carriage of a flat-knitting machine, and reducing the voltage applied to the motor when the virtual temperature exceeds an admissible value.

In the technique of JP 2003-009563 A or JP H09-179623 A, the acceleration/deceleration time constant is changed based on the detected or estimated motor temperature. Generally, when a certain torque is necessary to accelerate or decelerate the motor and the motor should be frequently accelerated or decelerated, an amount of heat generation of the motor is increased. Therefore, it is effective to change (extend) the time constant in order to decrease the amount of heat generation. However, the motor may be overheated not only when the motor is accelerated or decelerated, but also when a heavy-loaded processing is continuously carried out. It is not effective for the latter case to extend the time constant.

On the other hand, the technique described in JP 2009-041130 A may be effective for the flat knitting machine as disclosed, i.e., wherein the rotation torque of the motor is generally constant even when the velocity is varied. However, this technique cannot be applied to a machine tool wherein the cutting load is rapidly increased when the motor velocity is decreased.

As described above, as factors in overheating of the spindle of the machine tool, high current due to the acceleration/deceleration (and the frequency thereof), and high current due to heavy cutting load (and a duration time thereof) may be possible. In the prior art, however, these factors cannot be discriminated from each other, and therefore it is difficult to take appropriate measures depending on the factors.

SUMMARY OF THE INVENTION

An object of the present invention is to provide a controller and a method for a machine tool, capable of discriminating the factors in overheating, and taking appropriate measures depending on each factor.

According to one aspect of the present invention, there is provided a controller of a machine tool having a spindle motor for driving a spindle and a feed shaft motor for driving a feed shaft, the controller comprising: a numerical controlling part which transmits an operation command to the spindle motor and the feed shaft motor; an acceleration/deceleration judging part which judges as to whether the spindle motor is in an acceleration/deceleration state; a current detecting part which detects a current value flowing in the spindle motor; a first temperature estimating part which estimates a first amount of change in temperature of the spindle motor due to the current flowing in the spindle motor when the spindle motor is in the acceleration/deceleration state; a second temperature estimating part which estimates a second amount of change in temperature of the spindle motor due to the current flowing in the spindle motor when the spindle motor is in a state other than the acceleration/deceleration state; a comparing part which compares the first and second amounts of change in temperature; and a motor temperature obtaining part which obtains a total amount of change in temperature of the spindle motor, wherein the numerical controlling part changes the operation command for at least one of the spindle motor and the feed shaft motor, when the total amount of change in temperature exceeds a predetermined threshold, based on a comparison result of the comparing part.

In a preferred embodiment, the motor temperature obtaining part obtains the total amount of change in temperature of the spindle motor based on a summation of an estimated value of the first temperature estimating part and an estimated value of the second temperature estimating part.

Otherwise, the motor temperature obtaining part may obtain the total amount of change in temperature of the spindle motor based on an output value of a thermistor incorporated in the spindle motor.

In a preferred embodiment, the acceleration/deceleration judging part calculates a slope of a velocity command for the spindle motor or an actual velocity of the spindle motor, and judges that the spindle motor is in the acceleration/deceleration state when the slope exceeds a predetermined threshold.

Otherwise, the acceleration/deceleration judging part may calculate a velocity deviation which corresponds to a difference between a velocity command for the spindle motor and an actual velocity of the spindle motor, and may judge that the spindle motor is in the acceleration/deceleration state when the velocity deviation exceeds a predetermined threshold.

In a preferred embodiment, the controller decreases an output of the spindle motor when an estimated value of the first temperature estimating part is larger than a value obtained by multiplying an estimated value of the second temperature estimating part by a coefficient more than one.

In this case, the controller may decrease a torque command for the spindle motor and/or increases an acceleration/deceleration time constant, in order to decrease an output of the spindle motor while accelerating/decelerating the spindle motor.

In a preferred embodiment, the controller decreases a velocity of the feed shaft motor when an estimated value of the second temperature estimating part is larger than a value obtained by multiplying an estimated value of the first temperature estimating part by a coefficient more than one.

In a preferred embodiment, the controller decreases an output of the spindle motor and decreases a velocity of the feed shaft motor, when an estimated value of the first temperature estimating part is equal to or less than a value obtained by multiplying an estimated value of the second temperature estimating part by a coefficient more than one and when an estimated value of the second temperature estimating part is equal to or less than a value obtained by multiplying an estimated value of the first temperature estimating part by a coefficient more than one.

According to another aspect of the present invention, there is provided a controlling method of a machine tool having a spindle motor for driving a spindle and a feed shaft motor for driving a feed shaft, the method comprising the steps of: judging as to whether the spindle motor is in an acceleration/deceleration state; detecting a current value flowing in the spindle motor; estimating a first amount of change in temperature of the spindle motor due to the current flowing in the spindle motor when the spindle motor is in the acceleration/deceleration state; estimating a second amount of change in temperature of the spindle motor due to the current flowing in the spindle motor when the spindle motor is in a state other than the acceleration/deceleration state; comparing the first and second amounts of change in temperature; obtaining a total amount of change in temperature of the spindle motor; and changing an operation command for at least one of the spindle motor and the feed shaft motor, when the total amount of change in temperature exceeds a predetermined threshold, based on a comparison result regarding the first and second amounts of change in temperature.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
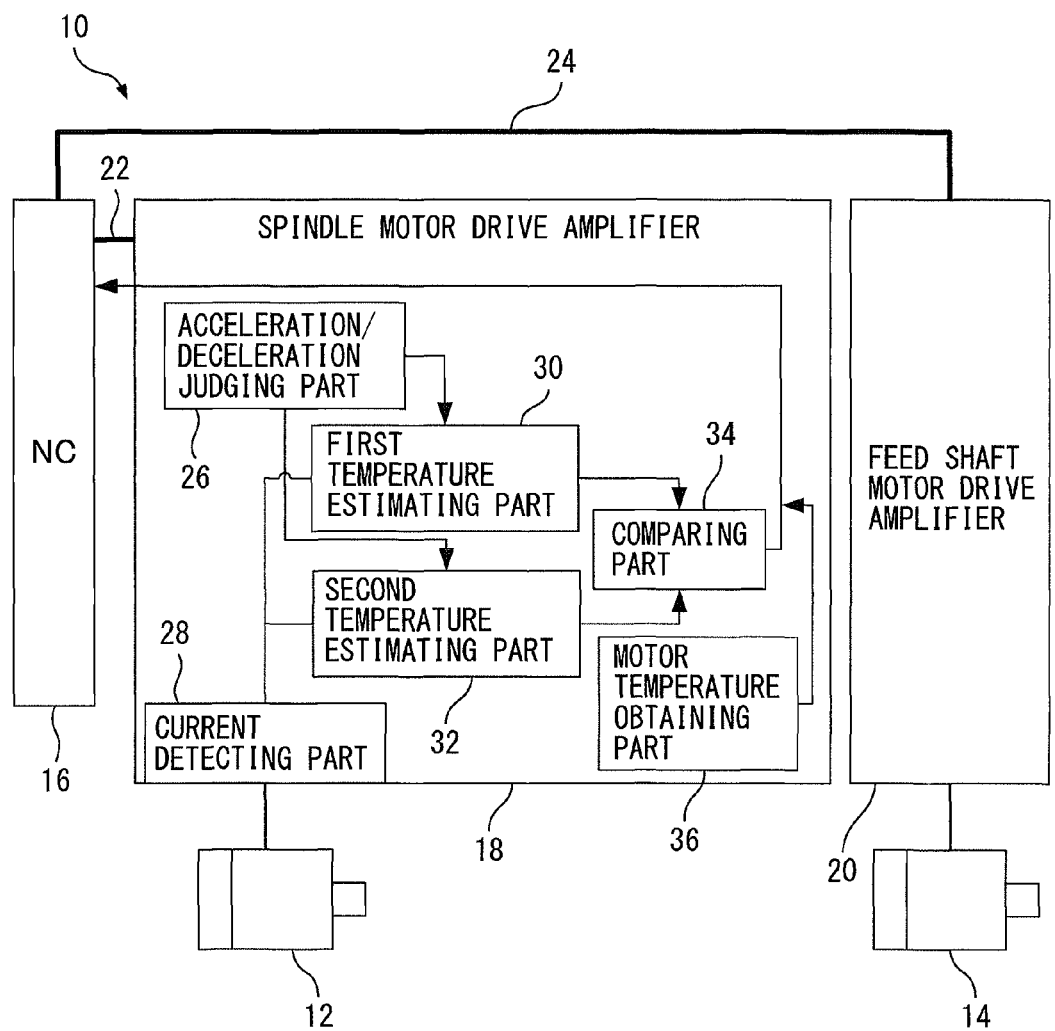
FIG. 1 is a functional block diagram of a basic configuration of a controller of a machine tool according to the present invention.

FIG. 1 shows a functional block diagram of a basic configuration of a controller of a machine tool according to the present invention. Controller 10 has a numerical controlling part (NC) 16 which controls a spindle motor 12 for driving a spindle (not shown) of the machine tool and a feed shaft motor (for example, a servomotor) 14 for driving a feed shaft (not shown) of the machine tool. A command (for example, an operation command) from numerical controlling part 16 is transmitted to an amplifier 18 for driving the spindle motor (or a first amplifier) connected to spindle motor 12 and an amplifier 20 for driving the feed shaft motor (or a second amplifier) connected to feed shaft motor 14, wherein first and second amplifiers 18 and 20 supplies current to spindle motor 12 and feed shaft motor 14, respectively, based on the command from numerical controlling part 16. In the example of FIG. 1, first and second amplifiers 18 and 20 are connected to numerical controlling part 16 via first and second amplifier communication buses 22 and 24, respectively, wherein the command from numerical controlling part 16 is transmitted to first amplifier 18 or second amplifier 20 through the bus.

First amplifier 18 has an acceleration/deceleration judging part 26 which judges as to whether spindle motor 12 is in an acceleration/deceleration state (or is accelerated or decelerated); a current detecting part 28 which detects a current value flowing in spindle motor 12; a first temperature estimating part 30 which estimates an amount of change in temperature of spindle motor 12 due to the current flowing in spindle motor 12 when spindle motor 12 is accelerated or decelerated; a second temperature estimating part 32 which estimates an amount of change in temperature of spindle motor 12 due to the current flowing in spindle motor 12 when spindle motor 12 is in an operation (for example, stopping or rotating at a constant rate) other than the acceleration or deceleration; a comparing part 34 which compares the estimated values of the first and second temperature estimating parts 30 and 32; and a motor temperature obtaining part 36 which obtains the temperature of spindle motor 12. Then, numerical controlling part 16 transmits an operation command for changing the operation of at least one of spindle motor 12 and feed shaft motor 14, when the temperature of spindle motor 12 obtained by temperature obtaining part 36 exceeds a predetermined threshold, based on a comparison result of comparing part 34.

Figure 2:
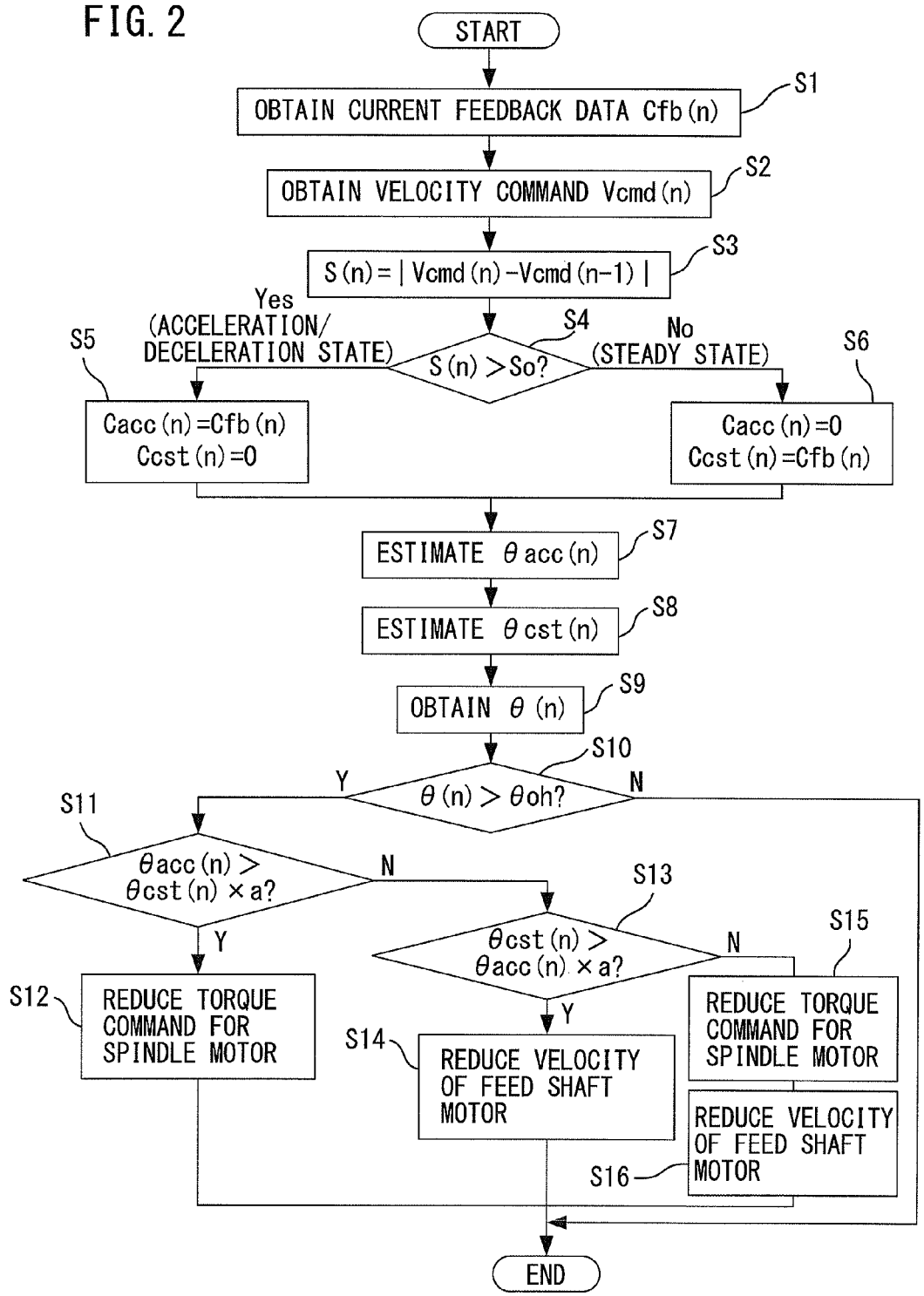
FIG. 2 is a flowchart indicating one example of the procedure of the controller of FIG. 1.

Next, the function of each part as described above will be explained, with reference to a flowchart as shown in FIG. 2.

In the present invention, in order to identify the cause of overheat of spindle motor 12, an amount of change (increase) in temperature of spindle motor 12 is divided into a factor due to acceleration/deceleration of the spindle motor and a factor due to steady or constant load applied to the spindle motor. First, current feedback data Cfb(n) of spindle motor 12 is obtained by using current detecting part 28 at predetermined sampling periods of time (step S1), and then a velocity command Vcmd(n) is obtained from numerical controller 16 (step S2).

Next, an absolute value S(n) of a difference between velocity command Vcmd(n) obtained in step S2 and velocity command Vcmd(n−1) obtained at the previous sampling period (i.e., the difference corresponds to a slope of the velocity commands) (step S3), and then S(n) is compared to a predetermined threshold $S_0$ (step S4). When S(n) is larger than threshold $S_0$, it is judged that spindle motor 12 is in the acceleration/deceleration state, and then current feedback value Cfb(n) is plugged for a current value Cacc(n) regarding the acceleration/deceleration state, while zero is plugged for a current value Ccst(n) regarding the state (or the steady state) other than the acceleration/deceleration state (step S5).

On the other hand, When S(n) is equal to or smaller than threshold $S_0$, it is judged that spindle motor 12 is in the steady state, and then zero is plugged for a current value Cacc(n) regarding the acceleration/deceleration state, while current feedback value Cfb(n) is plugged for current value Ccst(n) regarding the steady state (step S6). In other words, threshold $S_0$ as described above is set to a maximum value of the slope the velocity command when spindle motor 12 can be considered to be in the steady state. In addition, steps S3 to S6 may be carried out by acceleration/deceleration judging part 26.

Next, in first temperature estimating part 30, a first amount of change in temperature θacc(n) of spindle motor 12 due to acceleration/deceleration current Cacc(n) is estimated (step S7). Similarly, in second temperature estimating part 32, a second amount of change in temperature θcst(n) of spindle motor 12 due to steady current Ccst(n) is estimated (step S8). Concretely, estimated values θacc(n) and θcst(n) can be determined by following equations (1) and (2), respectively. In the equations, $\lambda=\exp(\Delta T/\tau)$; $\Delta T$ is a sampling period of time; $\tau$ is a thermal time constant; and K is a coefficient for calculating a motor temperature from a current input value.

$$\theta acc(n)=\lambda \cdot \theta acc(n-1)+(1-\lambda)\cdot K\cdot (Cacc(n))^2 \qquad (1)$$

$$\theta cst(n)=\lambda \cdot \theta cst(n-1)+(1-\lambda)\cdot K\cdot (Ccst(n))^2 \qquad (2)$$

In the next step S9, in motor temperature obtaining part 36, a total amount of change in temperature θ(n) of spindle motor 12 is obtained. In the example of FIG. 2, an estimated value of amount of change in temperature θ(n) is obtained from estimated values θacc(n) and θcst(n). In a velocity region where an iron loss is negligible, estimated value θ(n) can be calculated by following equation (3).

$$\theta(n)=\theta acc(n)+\theta cst(n) \qquad (3)$$

In the next step S10, based on amount of change in temperature θ(n) of spindle motor 12 obtained in step S9, it is judged as to whether spindle motor 12 is overheated or is almost overheated. This judgment may be carried out by numerical controlling part 16 or the other means. Concretely, θ(n) is compared to a value θoh obtained by multiplying a coefficient not more than one (for example, a coefficient less than one such as 0.8, 0.85, 0.9 or 0.95) by an amount of change (increase) in temperature of the motor in which spindle motor 12 is considered to be overheated. Then, when θ(n) exceeds θoh, the procedure progresses to step S11. Otherwise, when θ(n) is equal to or less than θoh, it can be judged that spindle motor 12 is not overheated nor is almost overheated, and thus the procedure is returned to step S1 so that the process is carried out in the next sampling period.

In step S11, it is judged as to whether amount of change in motor temperature θacc due to the acceleration/deceleration current, estimated in step S7, is sufficiently larger than amount of change in motor temperature θcst due to the steady current, estimated in step S8. Concretely, as shown in following equation (4), θacc is compared to a value obtained by multiplying θcst by a coefficient "a" equal to or larger than one. When θacc is larger than the value, the major factor in overheating spindle motor 12 is considered to be heating by the acceleration/deceleration current. Therefore, when equation (4) is true, the procedure progresses to step S12, wherein the operation of spindle motor 12 is changed, concretely, the torque command for spindle motor 12 is decreased or the acceleration/deceleration time constant is increased, in order to the output during accelerating or decelerating the motor. Otherwise, both the decrease of the torque command and the increase of the acceleration/deceleration time constant may be carried out.

$$\theta acc(n)>\theta cst(n)\cdot a(a\geq 1) \qquad (4)$$

On the other hand, in step S11, when θacc is equal to or smaller than the value obtained by multiplying θcst by coefficient "a" equal to or more than one (i.e., equation (4) is not true), the procedure progresses to step S13, wherein it is judged as to whether amount of change in motor temperature θcst due to the steady current, estimated in step S8, is sufficiently larger than amount of change in motor temperature θacc due to the acceleration/deceleration current, estimated in step S7. Concretely, as shown in following equation (5), θcst is compared to a value obtained by multiplying θacc by a coefficient "a" equal to or larger than one. When θcst is larger than the value, the major factor in overheating spindle motor 12 is considered to be heating by the steady current. Therefore, when equation (5) is true, the major factor in overheating cannot be eliminated when the operation of spindle motor 12 (or the spindle) is changed. Accordingly, the procedure progresses to step S14, wherein the operation of feed shaft motor 14 is changed, concretely, the velocity command for feed shaft motor 14 is decreased, in order to reduce the steady load such as the cutting load. In addition, coefficient "a" equal to or more than one, used in steps S11 and S13, may be determined the application of the machine tool and/or a manner of the machining. For example, coefficient "a" may be a value equal to or more than 2, 3, 5 or 10.

$$\theta cst(n)>\theta acc(n)\cdot a(a\geq 1) \qquad (5)$$

On the other hand, in step S13, when θcst is equal to or smaller than the value obtained by multiplying θacc by coefficient "a" equal to or more than one (i.e., equation (5) is not true), a difference between the amounts of change in temperature is within a predetermined range (i.e., is not considerable). Therefore, it is difficult to identify either the acceleration/deceleration current or the steady current as the major factor in overheating spindle motor 12, in other words, the both currents are considered to be the major factor. In this case, therefore, the procedure progresses to step S15 so as to carry out a process similar to step S12 (i.e., decreasing the torque command or increasing the acceleration/deceleration time constant of spindle motor 12), and further, progresses to step S16 so as to carry out a process similar to step S14 (i.e., decreasing the velocity command of feed shaft motor 14). Of course, the execution order of steps S15 and S16 may be reversed, or, steps S15 and S16 may be simultaneously carried out. In addition, among steps S11 to S16, steps S11 and S13 may be carried out by comparing part 34, and the remaining steps may be carried out by numerical controlling part 16.

The procedure including steps S1 to S16 as described above is repeated and carried out at predetermined sampling periods of time. By virtue of such a series of procedures, the amount of change in motor temperature can be estimated in relation to each of the acceleration/deceleration current and the steady current, and it can be judged as to which is the major factor in overheating, the acceleration/deceleration current, or the steady current, or both, when the temperature of the spindle motor is overheated or is almost overheated. Therefore, in the invention, appropriate measures can be taken depending on the judgment result, and the factor in overheating can be effectively and automatically eliminated.

Figure 3:
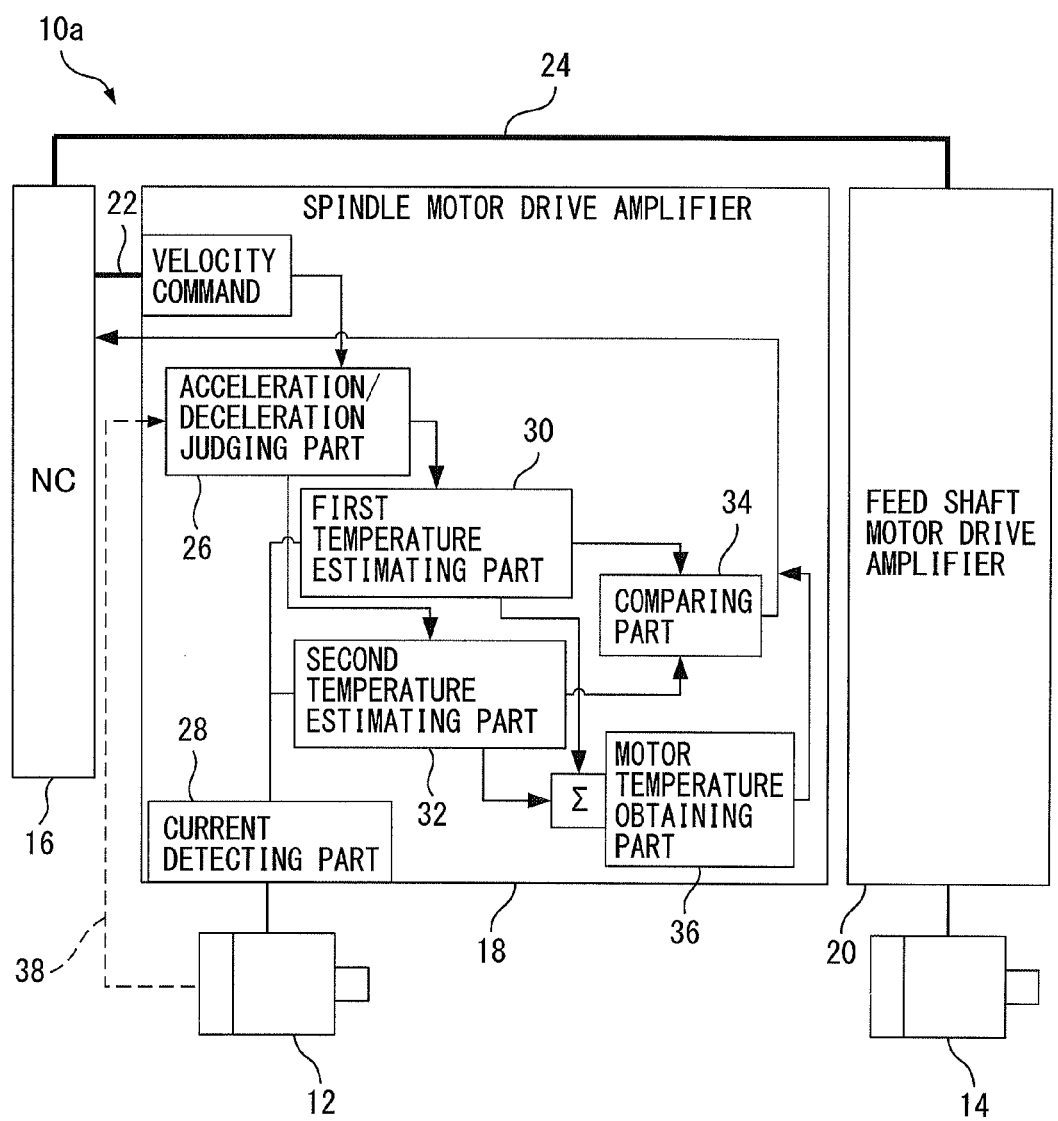
FIG. 3 is a functional block diagram of a first embodiment of the controller of the invention.

FIG. 3 is a functional block diagram of a controller 10a according to a first embodiment of the invention, which is adapted to carry out the procedure of the flowchart of FIG. 2. In the above explanation regarding steps S3 and S4, velocity command Vcmd from numerical controlling part 16 is used to judge as to whether spindle motor 12 is in the acceleration/deceleration state. However, as shown by a dotted line 38 in FIG. 3, instead of the velocity command from numerical controlling part 16, an actual velocity of spindle motor 12 may be obtained at predetermined sampling periods of time, and the judgment regarding the acceleration/deceleration state may be carried out by processes similar to steps S3 and S4. In addition, to the components of FIG. 3 corresponding to the components of FIG. 1, the same reference numerals are added, and detailed explanations thereof will be omitted.

Figure 4:
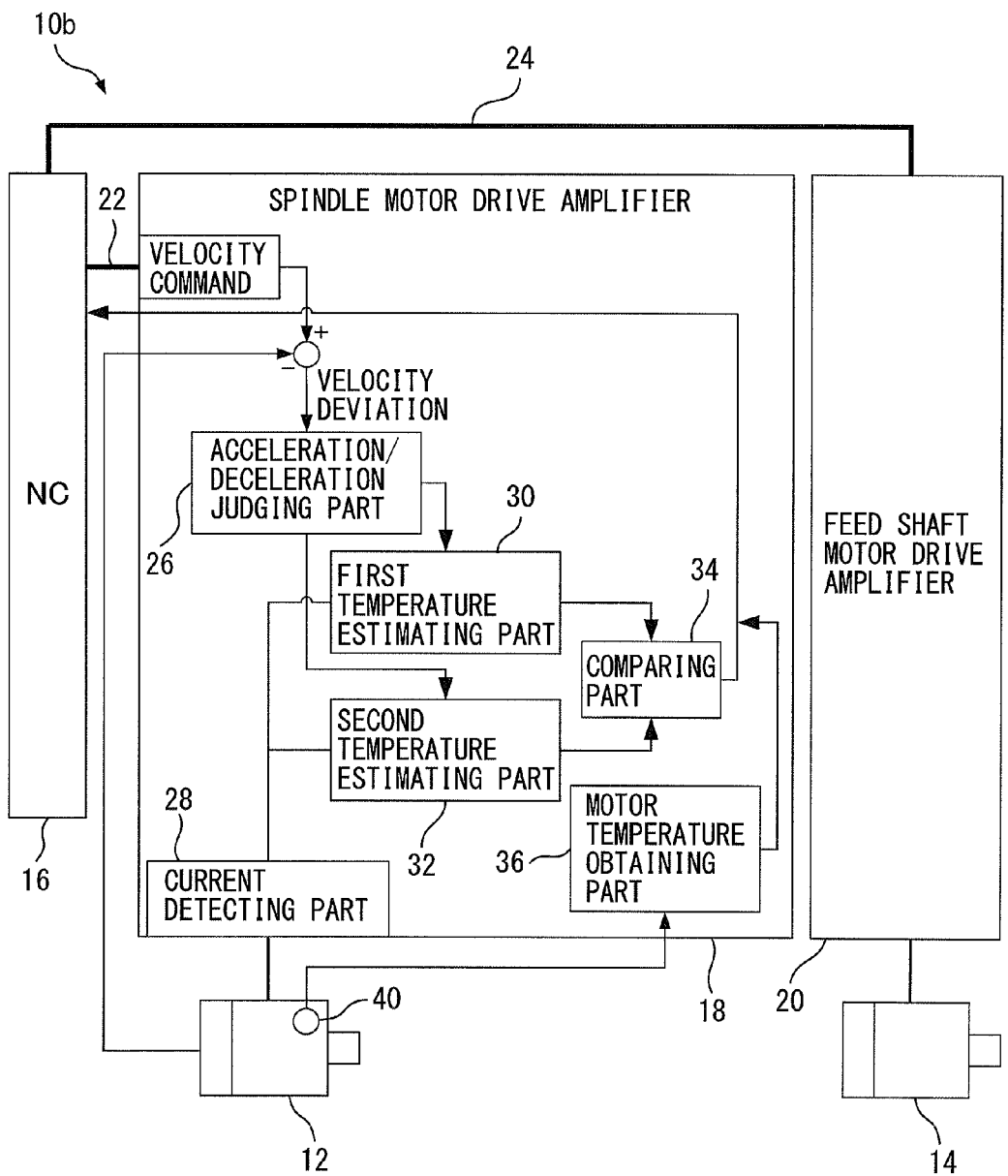
FIG. 4 is a functional block diagram of a second embodiment of the controller of the invention.

FIG. 4 is a functional block diagram of a controller 10b according to a second embodiment of the invention. In controller 10b, unlike controller 10a of FIG. 3 wherein motor temperature obtaining part 36 obtains the motor temperature by the sum of estimated amount of change values θacc and θcst obtained by first and second temperature estimating parts 30 and 32, the total amount of change in motor temperature is obtained by obtaining an output of a temperature detector for detecting the temperature of spindle motor 12, such as a thermistor 40, at predetermined periods of time.

Further, in controller 10b, when judging the acceleration/deceleration by acceleration/deceleration judging part 26, unlike controller 10a wherein the rate of change (or the slope) of the velocity command or the actual motor velocity is used, a deviation (or a velocity deviation) between the velocity command for spindle motor 12 and the actual velocity of spindle motor 12 is calculated, and then it is judged that the spindle motor is in the acceleration/deceleration state when the velocity deviation exceeds a predetermined threshold. Generally, when accelerating or decelerating a motor, there may be a time delay (time lag) until an actual velocity coincides with (follows) a velocity command. Therefore, when the velocity deviation is relatively large, it can be judged that the motor is in the acceleration/deceleration state. In addition, to the components of FIG. 4 corresponding to the components of FIG. 1, the same reference numerals are added, and detailed explanations thereof will be omitted.

The controller of the present invention is not limited to the controller as described in FIG. 3 or 4. For example, motor temperature obtaining part 36 may use the estimated values obtained by first and second temperature estimating parts 30 and 32, and the acceleration/deceleration judging part may use the velocity deviation between the actual velocity and the velocity command. In addition, motor temperature obtaining part 36 may use the output of thermistor 40, and the acceleration/deceleration judging part may use the change ratio of the velocity command or the actual velocity.

According to the present invention, the amount of change in temperature of the spindle motor can be estimated in each of the acceleration/deceleration state and the other state, and it can be judged as to which is the major factor in overheating, the acceleration/deceleration current, or the steady current, or the both, when the spindle motor is overheated or is almost overheated. Therefore, appropriate measures can be taken depending on the judgment result, and the factor in overheating can be effectively and automatically eliminated.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A controller of a machine tool having a spindle motor for driving a spindle and a feed shaft motor for driving a feed shaft, the controller comprising:
   a numerical controlling part which transmits an operation command to the spindle motor and the feed shaft motor;
   an acceleration/deceleration judging part which judges as to whether the spindle motor is in an acceleration/deceleration state;
   a current detecting part which detects a current value flowing in the spindle motor;
   a first temperature estimating part which estimates a first amount of change in temperature of the spindle motor due to the current flowing in the spindle motor when the spindle motor is in the acceleration/deceleration state of operation;
   a second temperature estimating part which estimates a second amount of change in temperature of the spindle motor due to the current flowing in the spindle motor when the spindle motor is in a steady state of operation;
   a motor temperature obtaining part which obtains a total amount of change in temperature of the spindle motor, based on the first amount of change in temperature and the second amount of change in temperature; and
   a comparing part which compares the first and second amounts of change in temperature;
   wherein when the total amount of change in temperature exceeds a predetermined threshold, the numerical controlling part is configured to:
   1) change the operation command of the spindle motor, when the comparison of the first and second amounts of change in temperature indicates that the first amount of change in temperature exceeds the second amount of change in temperature multiplied by a coefficient,
   2) change the operation command of the feed shaft motor, when the comparison of the first and second amounts of change in temperature indicates that the second amount of change in temperature exceeds the first amount of change in temperature multiplied by the coefficient, and
   3) change the operation command of the spindle motor and the feed shaft motor, when the comparison of the first and second amounts of change in temperature indicates that the first amount of change in temperature does not exceed the second amount of change in temperature multiplied by the coefficient and the second amount of change in temperature does not exceed the first amount of change in temperature multiplied by the coefficient.

2. The controller as set forth in claim 1, wherein the motor temperature obtaining part obtains the total amount of change in temperature of the spindle motor based on a summation of an estimated value of the first temperature estimating part and an estimated value of the second temperature estimating part.

3. The controller as set forth in claim 1, wherein the motor temperature obtaining part obtains the total amount of change in temperature of the spindle motor based on an output value of a thermistor incorporated in the spindle motor.

4. The controller as set forth in claim 1, wherein the acceleration/deceleration judging part calculates a slope of a velocity command for the spindle motor or an actual velocity of the spindle motor, and judges that the spindle motor is in the acceleration/deceleration state when the slope exceeds a predetermined threshold.

5. The controller as set forth in claim 1, wherein the acceleration/deceleration judging part calculates a velocity deviation which corresponds to a difference between a velocity command for the spindle motor and an actual velocity of the spindle motor, and judges that the spindle motor is in the acceleration/deceleration state when the velocity deviation exceeds a predetermined threshold.

6. The controller as set forth in claim 1, wherein the controller decreases an output of the spindle motor when an estimated value of the first temperature estimating part is larger than a value obtained by multiplying an estimated value of the second temperature estimating part by a coefficient more than one.

7. The controller as set forth in claim 6, wherein the controller decreases a torque command for the spindle motor and/or increases an acceleration/deceleration time constant, in order to decrease an output of the spindle motor while accelerating/decelerating the spindle motor.

8. The controller as set forth in claim 1, wherein the controller decreases a velocity of the feed shaft motor when an estimated value of the second temperature estimating part is larger than a value obtained by multiplying an estimated value of the first temperature estimating part by a coefficient more than one.

9. The controller as set forth in claim 1, wherein the controller decreases an output of the spindle motor and decreases a velocity of the feed shaft motor, when an estimated value of the first temperature estimating part is equal to or less than a value obtained by multiplying an estimated value of the second temperature estimating part by a coefficient more than one and when an estimated value of the second temperature estimating part is equal to or less than a value obtained by multiplying an estimated value of the first temperature estimating part by a coefficient more than one.

10. A controlling method of a machine tool having a spindle motor for driving a spindle and a feed shaft motor for driving a feed shaft, the method comprising the steps of:
   judging as to whether the spindle motor is in an acceleration/deceleration state;
   detecting a current value flowing in the spindle motor;
   estimating a first amount of change in temperature of the spindle motor due to the current flowing in the spindle motor when the spindle motor is in the acceleration/deceleration state of operation;
   estimating a second amount of change in temperature of the spindle motor due to the current flowing in the spindle motor when the spindle motor is in a steady state of operation;
   obtaining a total amount of change in temperature of the spindle motor based on the first amount of change in temperature and the second amount of change in temperature;
   comparing the first and second amounts of change in temperature; and
   wherein when the total amount of change in temperature exceeds a predetermined threshold:
   1) changing the operation command of the spindle motor, when the comparison of the first and second amounts of change in temperature indicates that the first amount of change in temperature exceeds the second amount of change in temperature multiplied by a coefficient,
   2) changing the operation command of the feed shaft motor, when the comparison of the first and second amounts of change in temperature indicates that the second amount of change in temperature exceeds the first amount of change in temperature multiplied by the coefficient, and
   3) changing the operation command of the spindle motor and the feed shaft motor, when the comparison of the first and second amounts of change in temperature indicates that the first amount of change in temperature does not exceed the second amount of change in temperature multiplied by the coefficient and the second amount of change in temperature does not exceed the first amount of change in temperature multiplied by the coefficient.

* * * * *